Aug. 16, 1938.   W. BURCHENAL ET AL   2,126,869
METHOD OF AND APPARATUS FOR MAKING FORMED BITUMINOUS BODIES
Filed April 10, 1934   2 Sheets-Sheet 1
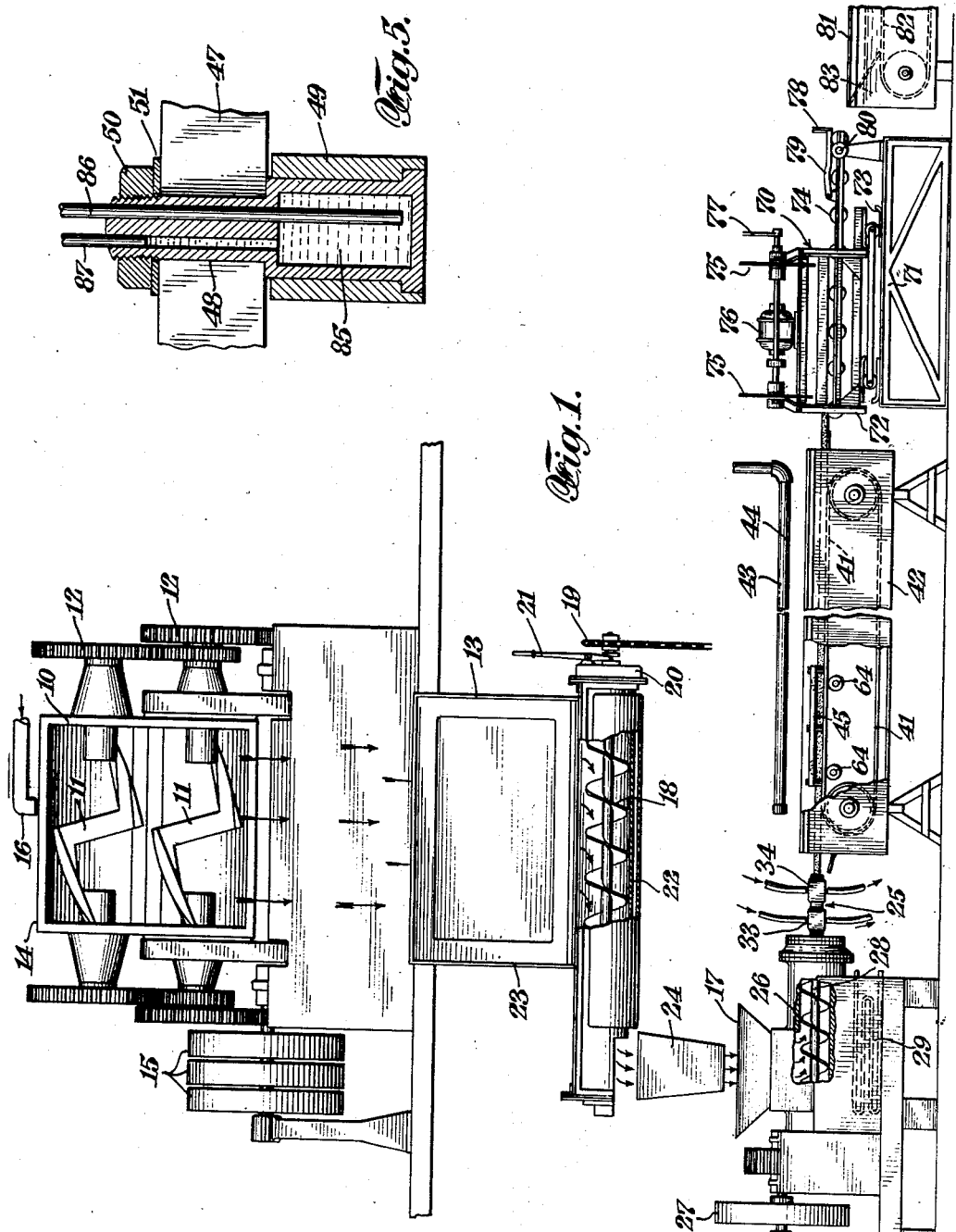
INVENTORS
William Burchenal
Anthony J Pfohl
BY
Kenyon & Kenyon
ATTORNEYS Aug. 16, 1938.  W. BURCHENAL ET AL  2,126,869
METHOD OF AND APPARATUS FOR MAKING FORMED BITUMINOUS BODIES
Filed April 10, 1934  2 Sheets-Sheet 2
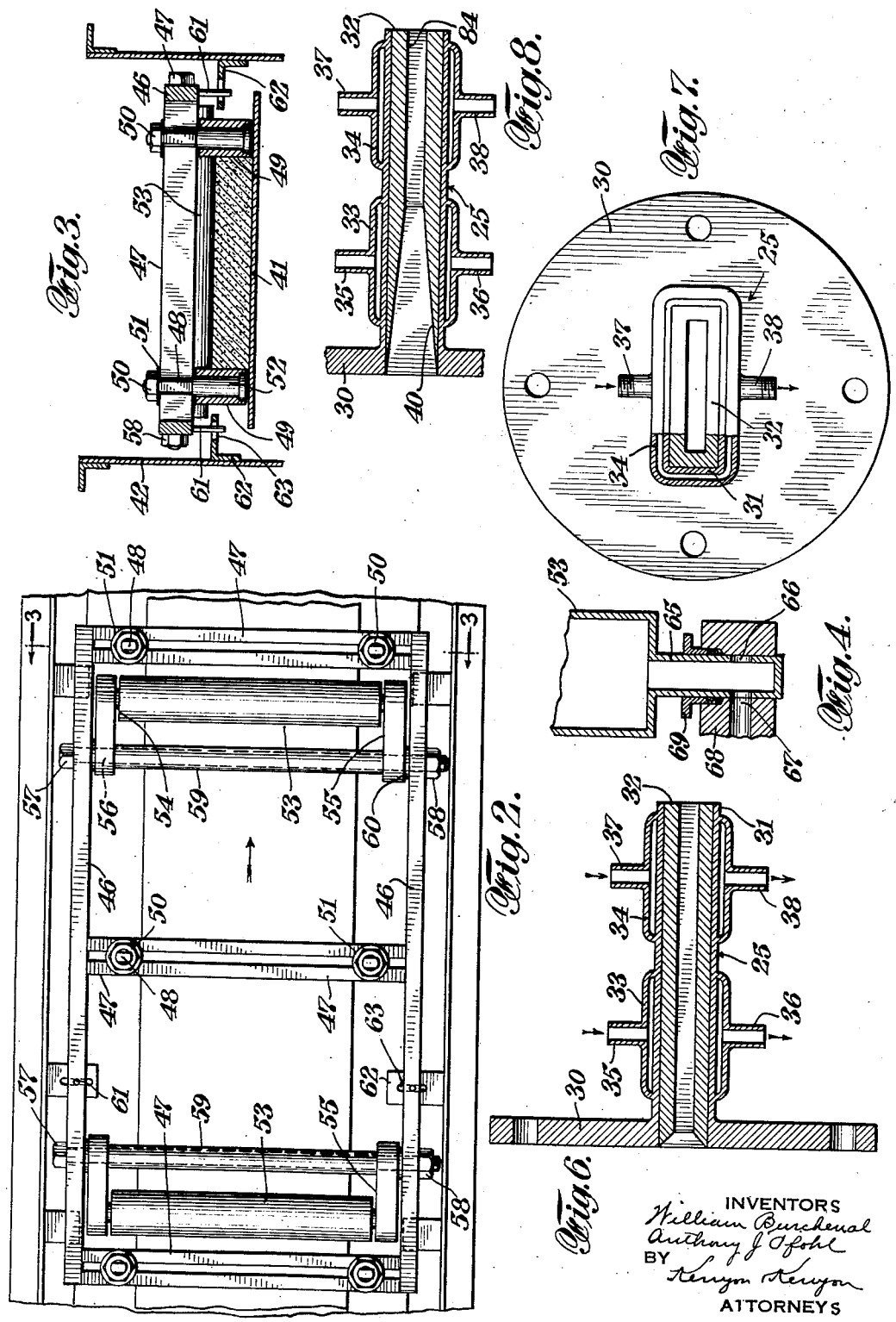
INVENTORS
William Burchenal
Anthony J. Pohl
BY Kenyon & Kenyon
ATTORNEYS Patented Aug. 16, 1938

2,126,869

UNITED STATES PATENT OFFICE 2,126,869

METHOD OF AND APPARATUS FOR MAKING FORMED BITUMINOUS BODIES

William Burchenal, Glendale, and Anthony J. Pfohl, Cincinnati, Ohio, assignors to The Philip Carey Manufacturing Company, a corporation of Ohio Application April 10, 1934, Serial No. 719,844

13 Claims. (Cl. 18—4)

This invention relates to method of and apparatus for making formed bituminous bodies. It relates particularly to method of and apparatus for making bituminous bodies and articles such as asphalt planks which contain asphaltic material reinforced with filler material of a fibrous and/or finely divided nature and which are designed for purposes such as industrial flooring, road surfacing, wear-resisting surfaces for bridge lanes, platforms and the like.

While this invention relates to the manufacture of bituminous bodies generally, this invention will be described herein for the purpose of convenience and by way of illustration in connection with the manufacture of planking, and this term will be understood to include formed bituminous bodies and articles generally.

Features of this invention relate to the manufacture of formed bituminous bodies such as asphalt planking by mixing melted bituminous material of suitable melting-point and penetration with filler material of a fibrous and/or finely divided nature to form a mixture wherein the filler material is coated with the bituminous material and by forcing the mixture by means of suitable apparatus through an extrusion die to produce formed bituminous bodies of desired cross-section.

It is a purpose of this invention to control the mixing operation so that filler material is more thoroughly and efficiently coated and homogenized than by methods heretofore practiced and to further control the mixing operation so that the mass is placed in a condition favorable for storing and feeding to extrusion apparatus. It is also the purpose of this invention to provide certain novel apparatus and methods of manipulation for transferring mixed material and maintaining its plasticity favorable for a succeeding extruding operation.

Further purposes of this invention relate to the forming of a bituminous plank, for example, so as to make it of a highly compact and dense structure and giving the formed plank a smooth and regular surface. It is a further purpose of this invention to produce bituminous planking which is straight and of accurate dimensions.

In the manufacture of formed bituminous bodies, filler material is first mixed with bituminous material while the latter is in a heated and melted condition.

It is a feature of this invention that the bituminous material is mixed with filler material in such a manner that the mass becomes separated into a plurality of substantially independent bodies or lumps carrying on the surface thereof a portion of finely divided filler material only partially coated with bitumen. Thus, for example, in the practice of this invention, it is preferable to incorporate all fibrous filler with the bituminous material and to mix the same thoroughly so that the fiber is thoroughly and completely coated. Also, a portion of finely divided material may also be thoroughly mixed in and coated with the bituminous material. However, another portion of the finely divided mineral material is added during a latter stage of mixing, and by discontinuing the mixing a limited time after this portion of finely divided material is added, the mass in the mixer is caused to separate into a plurality of bodies or lumps of about one-half inch to four inches in diameter, the individual bodies being separated by adhering finely divided mineral matter carried thereby.

Further in the practice of this invention, the mixed material preferably after it has been reduced to the lumped condition above referred to is transferred from the mixer to a suitable storage hopper from which the material is intermittently taken to the extrusion apparatus. The storage hopper is preferably heated in a suitable manner as by steam jacketing to prevent the mass of material from becoming excessively cooled and to cause the mixed material to be maintained in a plasticity maintaining zone. Preferably, the extrusion apparatus is maintained in continuous operation and the same is supplied by intermittently withdrawing mixed material from the placticity maintaining zone. The mixed material in passing from the mixer to the extrusion apparatus will have become somewhat cooled and in the practice of this invention, the material is heated in the extrusion apparatus to a plastic condition which is favorable to the extrusion of the material through the orifice. In one form of apparatus for practicing this invention, the material is forced to and through an extrusion orifice by means of the screw conveyor. As before stated, the material is preferably introduced into the extrusion apparatus in form of bodies or lumps carrying adhering finely divided mineral matter which has not as yet been thoroughly coated with the bitumen. In the extrusion apparatus, the material is maintained in a plastic condition and is worked upon by the screw conveyor pressure means, for example, so that the uncoated material adhering to the bodies or lumps becomes thoroughly coated with the bituminous matrix. Thus the homogenization of the mass is completed just prior to the extrusion of the same through an extrusion die.

It is one of the features of this invention that the material while being forced through an extrusion die is contacted peripherally with inner confining surfaces of an extrusion die, portions of which are maintained at different temperatures. The extrusion die is preferably of substantial length and the portions of the inner walls thereof which are at different temperature are also preferably of substantial length. For example, the mixed material in being forced through an extrusion die is subjected first to a temperature favorable to the forming and compacting of the mixed material and is thereafter subjected superficially to a temperature which is favorable to smoothing the surface of the material formed in the first portion and which is substantially higher than the temperature to which the material is first subjected. By thus controlling the temperatures to which the material is exposed during extrusion, the material passing through the extrusion die by being at first subjected to a low temperature is offered a relatively high resistance. The result which is thus afforded according to this invention is to highly compact the mixed material as it is passed through the extrusion die. Any degree of compacting may be secured, as desired, by this means, limited only by the strength of the machine. By forcing the mixed material through an extrusion die which is maintained, for example, at a temperature of about 50° to 75° F. colder than the material approaching the extrusion die, a satisfactory compacting of the material can be secured.

After the material has been forced through a portion of the extrusion die which is maintained relatively cool, as above described, the material formed therein can, according to this invention, be thereafter passed through a further portion of the extrusion die which is heated to a temperature which is substantially higher than that occurring in the first portion. The heat applied to the second portion of the extrusion die serves to soften the asphalt at the surface of the plank so that the extruded material is given a smooth surface free from roughness.

While it is regarded as preferable in the practice of this invention to pass mixed bituminous material first through a cool portion of an extrusion die and then through a more highly heated portion of the extrusion die, it is not without the scope of this invention to reverse the procedure and to first pass the mixed bituminous material through a portion of the extrusion die more highly heated than the portion further removed from the inner end. Such a procedure would be desirable to facilitate the entry of a relatively stiff mixture into an extrusion die and thereafter afford increased resistance to the passage of the material through the die by cooling the surface of the more remote portion of the die.

A further feature of this invention resides in compacting mixed material entering an extrusion die by subjecting the material under pressure to a wedging action as by forcing the same through an extrusion die the inner walls of which comprise a tapered portion which confines the material passing therethrough to a progressively smaller cross-section. Such a tapered portion of substantial length is preferably combined with a portion having substantially parallel inner walls so that the material after having been brought down to desired cross-section is thereafter smoothed. Moreover, these features of this invention are preferably combined with the maintenance of the tapered and parallel portions of the inner walls of the extrusion die at different temperatures.

A feature of this invention resides in smoothing the surface of the bituminous mixture after the same has been extruded from the extrusion die. It is a further feature of this invention that the dimensions of the extruded material are made accurate and uniform by passing the same in operative relation with suitable means for effecting such purpose, which means at the same time preferably serves to smooth the surface of the material. A further feature of this invention resides in subjecting the extruded body of material to a straightening operation either with or without conjunction with the smoothing and dimensioning operations. These operations are preferably caused to occur before the material has had an opportunity for cooling and stiffening excessively and before the extruded material is positively cooled to substantial degree by positive cooling means such as water applied to the surface thereof. Thus, the material is smoothed and/or brought to accurate dimension and/or straightened while still warm enough to be somewhat plastic and preferably is immediately thereafter cooled as by contact with water so that the same can be permanently set while the same is smoothed, accurately dimensioned and straight.

While it is preferable to smooth, and/or dimension, and/or straighten the extruded material prior to cooling, it is not without the scope of this invention to combine the smoothing and cooling operations or to cool the material to a certain extent prior to the smoothing, dimensioning and straightening operations. However, in the latter case more pressure has to be exerted upon the surface of the extruded material to effect the desired results.

After the material has been formed into an extruded body, it may be cut into articles of desired length and cooled. The smoothing and dimensioning and straightening operations are preferably performed intermediate the extruding and cutting operations. Moreover, the material is preferably partially cooled prior to the cutting operation, the cooling being completed after the cutting operation.

The formed material can be dusted with suitable pulverulent material such as soapstone, mica flakes or other suitable material to assist in the handling of the material and also to prevent any possible adhesion or sticking of adjacent formed bodies when piled together.

The apparatus which is employed according to this invention comprises features relating to the mixing and extruding means and to intermediate storage and conveying means and to plasticizing means combined therewith. Added features of this invention relate to forming and smoothing means including an extrusion die which comprises portions having heating means adapted to heat different portions of the die to different temperatures.

Further features of apparatus embodying this invention reside in smoothing means, dimensioning means and in straightening means. For example, one embodiment of the invention comprises rollers for smoothing the surface of the formed body of extruded material and roller means for dimensioning and straightening the formed extruded mass. Further features of this invention reside in combining the aforesaid means with conveyor means co-operating to receive and carry along formed material emerging from the extrusion die.

Other features of apparatus embodying this invention reside in the mounting of the roller means above referred to and to cooling means for cooling the formed body in connection with smoothing, dimensioning, and straightening means.

Still further features of this invention relate to the cutting and cooling means.

Certain features of this invention reside in novel and useful combinations of operations and operative means, and in addition certain individual operations and operative means are new and useful in themselves and constitute distinct features of this invention.

Further objects, features and advantages of this invention will appear in connection with the following description of a specific embodiment of this invention in connection with the accompanying drawings, wherein—

Figure 1 is a schematic representation of apparatus for making formed bituminous bodies including mixing means, storing means, extruding means, smoothing means, cooling means and cutting means;

Fig. 2 is a detail plan view of part of the apparatus shown in Fig. 1 including means for smoothing, dimensioning, and straightening;

Fig. 3 is a sectional view of the apparatus shown in Fig. 2 taken on the line 3—3;

Fig. 4 is a detail sectional view of a part of one of the rollers and bearing therefor, showing a modified form whereby the rollers may be heated;

Fig. 5 is a detail sectional view of one of the vertical rollers in the modified form of this invention wherein the rollers are heated;

Fig. 6 is a side view in section showing in detail the construction of a form of extrusion die embodying this invention;

Fig. 7 is an end view of the extrusion die of Fig. 5 with a part thereof shown in section; and Fig. 8 is a modified form of extrusion die embodying this invention.

The mixer 10 is adapted to mix and homogenize heated bituminous material and solid filler material and contains mixer blades 11 which are adapted by suitable gearing 12 to rotate at any desired speed. Twin blades are preferably employed which are caused to rotate at slightly different speeds. The mixer 10 is mounted so that it can be tilted and brought to the position in which it is shown in Fig. 1. When the mixer 10 is tilted to the position shown, the contents thereof are discharged into the storage hopper 13.

The mixing container 10 preferably has a steam jacket 14 so that the material contained therein will be prevented from cooling excessively. The power for turning the mixer blades and for tilting the container to dumping position by suitable means (not shown), may be applied by pulleys 15 which can be driven by any suitable source of power (not shown). The hot asphalt is conveniently supplied to the mixer 10 by pipe 16. The solid material including fibre, finely-divided mineral material and the like may be added to the mixer in any suitable manner (not shown) as by suitable chutes or by hand.

The material contained in storage hopper 13 is fed into the hopper 17 of the extrusion apparatus as desired by means of a screw conveyor 18 which is adapted for intermittent movement by connection of the same to a suitable driving pulley 19 through clutch 20 having a hand lever 21.

The screw conveyor and storage hopper are both preferably surrounded by steam jackets 22 and 23 respectively. The material falling from the end of the screw conveyor is guided by a chute 24 to a hopper 17 of the extrusion apparatus.

The extrusion apparatus comprises the feeding hopper above mentioned and means for forcing the material contained in the hopper 17 to and through an extrusion die 25. In the embodiment of this invention shown in Fig. 1, the means for forcing the material to and through the extrusion die 25 is the screw conveyor 26 which is turned by means of a pulley 27 connected to any suitable source of power. The blades of the screw conveyor 26 are preferably mounted upon a heated hollow shaft 28 and underlying the screw conveyor 26 are steam coils 29. The heated shaft 28 and the steam coils 29 serve to heat the material in the extrusion apparatus as desired. The extrusion die 25 shown in Figs. 1, 5 and 6 preferably comprises a steel frame 30 having a flange adapted for connection with the extrusion apparatus and an extended part 31 adapted to hold a liner 32 of suitable material such as Babbitt metal.

According to this invention, the extrusion die has embodied therewith means for heating different portions thereof differently. As shown most clearly in Fig. 6, the extrusion die may include a first jacketed portion 33 and a second jacketed portion 34. The portion 33 is provided with an inlet 35 and an outlet 36. The portion 34 is provided with an inlet 37 and an outlet 38. By the construction above described, it is apparent that water or steam or other suitable fluid medium may be passed through the jacketed portions 33 and 34 at any desired temperatures, which may be made to be different by any suitable means (not shown).

In Fig. 8, a modified form of extrusion die is shown wherein the liner 32 of Babbitt metal is provided adjacent the extrusion apparatus end thereof with a slightly tapered portion 40. The angle of the tapered portion is preferably less than 45° to the longitudinal axis of the extrusion die and preferably is at an angle of about 15° to about 25° to the longitudinal axis of the extrusion die. By the employment of an extrusion die having a gradually tapered portion such as that shown by the reference character 40 in Fig. 8, the material in being forced through the die is caused to be confined to a progressively small cross-sectional area and to be highly compacted as it is passed therethrough. Especially when the portion 33 of the extrusion die is maintained cool so as to lower the temperature of the material being passed therethrough, the compacting of the material being forced through the extrusion die can be greatly increased. The remaining portion 34 of the inner walls of the extrusion die shown in Fig. 8 are preferably parallel so that the material in being forced therethrough will be smoothed after having been formed to desired cross section by tapered portion 40.

The extrusion die is preferably of substantial length and the two portions thereof above referred to are also of substantial length. Thus in the manufacture of rectangular planking about one-half to two inches in thickness and about six to eight inches in width it is desirable to employ an extrusion die about ten to fifteen inches in length. The extrusion die may contain two portions of approximately equal length which subject material being passed therethrough to different conditions as above described. It is to be understood that the above figures are illustrative merely and are not critical. The extrusion die may be of any desired cross-section so as to make extruded bodies of rectangular, polygonal, or other cross-section.

As the material is forced out of the extrusion die 25, it is passed to a continuous belt conveyor 41 in cooling box 42. Above the belt conveyor 41 and the plank which is carried thereon, is a pipe 43 provided with perforations 44 which is adapted to furnish a spray or other stream of water for cooling the plank as it is carried by the conveyor 41.

Carried within the cooling box 42 is a smoothing, dimensioning, and straightening device embodying some of the features of this invention. The smoothing and dimensioning device is indicated generally in Fig. 1 by the reference character 45 and is shown in detail in Figs. 2 and 3. The smoothing, dimensioning, and straightening device consists of a frame including longitudinal members 46 and lateral members 47. The lateral members are preferably arranged in pairs with a space therebetween through which passes a portion of roller-carrying vertical bolts 48. The lower ends of roller-carrying bolts 48 carry rotatively with respect thereto vertical rollers 49. The upper end of the bolts 48 have nuts 50 and washers 51 and, as the bearing portions 52 of bolts 48 are larger in diameter than the portions of the bolts passing between the frame members 47, the roller carrying bolts can be locked rigidly with respect to frame members 47 at any position laterally with respect to the frame. Thus the vertical rollers can be set with any desired lateral distance between them to accommodate formed plank material, for example, of different widths.

In addition to vertical rollers 49, the smoothing, dimensioning, and straightening apparatus includes horizontal rollers 53. The horizontal rollers 53 are rotatively mounted with respect to bearing shafts 54 which are held at either end by brackets 55.

The brackets 55 are pivoted about the bolts 56 which pass between the longitudinal frame members 46. The bolts 56 are provided at one end with heads 57 and at the other ends with nuts 58. Between the brackets 55 and about the bolts 56 are lock-pipes 59 and washers 60 so that by tightening the bolts 58, the brackets 55 may be firmly held between the lock-pipes 59 and washers 60 so that the horizontal rollers 53 may be set at any desired elevation.

In use, the horizontal rollers 53 are preferably set so that the distance from the lower ends thereof to the bottom of the periphery of vertical rollers 49 is about 1/32nd to 1/16th of an inch less than the width of the plank that is extruded from the extrusion die. Thus the vertical rollers 49 are kept from dragging on the conveyor belt 41.

The smoothing, dimensioning and straightening mechanism as a whole is preferably mounted according to this invention so as to be free to move laterally and vertically and to accommodate itself to variations in the plank that is extruded by the extrusion apparatus and to any movement of the belt conveyor upon which the plank rests. To this end, any suitable means may be employed and one type of such means includes the pins 61 fixed vertically to a part of the roller carrying frame and brackets 62 attached to box 42 having enlarged apertures 63 in the horizontal portions thereof through which the pins 61 extend.

The vertical rollers 49 are preferably mounted so that they contact with each side of a plank that is being passed therebetween and the plurality of rollers are preferably positioned so that the rollers which contact with a side of the plank are in a plane and so that the rollers contacting with the opposite sides of the plank lie in parallel planes. Thus the plank material passing between the plurality of rollers 49 contacting with both sides of the plank is caused to be straightened. Moreover, by setting the vertical rollers 29 at 90° with horizontal rollers 53, the accuracy and squareness of the edges and corners of the plank is insured.

While it is not essential in the practice of this invention, it is nevertheless within its scope to employ horizontal rollers 64 underlying horizontal rollers 53. While the belt conveyor in itself affords an accurate flat surface, nevertheless the rollers 64 may be employed to more accurately guide the conveyor belt 41. Moreover, by employing underlying rollers 64, it is possible to exert greater pressure between the top and bottom of the plank without excessively displacing the belt conveyor. Moreover, it is not without the scope of this invention to dispose of the belt conveyor entirely and to substitute therefor as carrying means a plurality of rollers 64 over which the extruded plank may pass and above which the frame or carriage 45 could be mounted. In such case to facilitate the movement of the extruded material, any one or more of the rollers 64 could be power driven.

While it is preferable to employ smoothing, dimensioning, and straightening means in combination, it is within the scope of this invention to employ any of these means separately. Moreover, the roller or rollers in one plane may be set at other angles than a right angle with respect to a roller or rollers in another plane. Other pressure contact surfaces other than rollers may also be employed according to this invention.

A modified form of this invention relating to the smoothing and dimensioning rollers is shown in Figs. 4 and 5. In Figs. 1 and 2, no means are shown for heating any of the rollers 49 and 53. A suitable means for heating the rollers 53 is shown in Fig. 4. Thus, the rollers 53 can be made hollow and provided with the hollow stem 65 having ports 66 therein which are adapted to register with a drilled portion 67 in the bearing 68. A suitable packing gland is provided to prevent the escape of the temperature maintaining fluid. The apparatus shown in Fig. 4 may be used at both the inlet or outlet ends of roller 53 and the temperature maintaining means may be water, steam, hot gases or other fluid adapted to be passed through the rollers and drilled portions 67, the latter being connected to suitable conduits (not shown) for bringing the fluid to and conducting it away from the rollers. In this modification of this invention the rollers are preferably maintained at a temperature substantially higher than the body of material with which they are caused to contact.

In Fig. 5 means for heating the rollers 49 is shown. In such case, the bolt 48 may be provided with a hollow core 85 and provided with inlet and outlet pipes 86 and 87, the pipe 86 being extended into the hollow core to afford circulation of the heating medium therein.

After passing through the cooling trough 42, the formed bituminous material is passed to a cutting device indicated generally by the reference character 70. The cutting device is mounted on a suitable frame 71 and comprises a carriage 72 mounted on double tracks 73. The carriage 72 has a plurality of horizontally disposed rollers 74 for carrying the plank material as it is moved thereon. Above the rollers is a pair of rotary saws 75 driven by means of a motor 76. The saws can be lowered so as to cut through an elongated body of plank material carried by rollers 74 by movement of a hand lever 77 in one direction and can be elevated again by the reversing movement of the hand lever. At the end of the carriage 72 is a stop 78 mounted on an arm 79 which is carried during a part of the travel of the carriage on stationary roller 80. In operation, the carriage is first placed in the position shown in Fig. 1 and the plank of material is moved thereon until the end thereof strikes stop 78. This causes the carriage to move to the right and at the same time the saw operator lowers the saw 75 so as to cut through the plank. As the carriage moves, the stop 78 drops out of the way and the length of plank can be moved off the carriage into cooling tank 81. Thereupon the saw operator moves the carriage back to the position shown in Fig. 1 and the operation is repeated.

The cooling tank 81 contains a conveyor belt 82 which is adapted to carry the planks of material underneath the surface of water 83 contained in the tank. The tank 81 can be made of any desired length and at the end of the tank the cooled planks may be removed therefrom by any suitable means (not shown) or by hand.

For the purpose of illustration, this invention will now be described in connection with the manufacture of formed bituminous bodies and particularly in connection with the manufacture of bituminous planking.

The ingredients of bituminous planking material may be selected as desired and are preferably mixed in predetermined weighed amounts. In usual practice, it is desirable to use an asphalt having a softening point of about 150° F. to about 235° F. (as determined by the ball and ring method) and having a penetration of about 40 to 3 (as determined by a Dow penetrometer—100 grams, 5 seconds at 77° F., in hundredths of a centimeter). With the asphalt, a certain proportion of fibrous material is preferably used. For ordinary purposes, cellulose fibre such as fiberized waste cotton, dry felt scrap, jute, manila and No. 2 roofing rags are desirable. Mineral fibre such as asbestos fibre or animal hair such as wool may also be used but the latter are not ordinarily as desirable as the cellulose fibres above referred to. A fibre having a length of about $\frac{1}{16}$th inch to ½ inch is preferable and ordinarily about five per cent. to about twenty-five per cent. of fibre gives satisfactory results in making bituminous planking. As a source of fibre and asphalt, waste shingle scrap and the like may also be incorporated into the mix which enters into the composition of the finished plank. In addition to the fibre a finely divided filler such as mineral granules is also used. The filler material may be in granulated form or in a more finely divided form. The filler material may be used in the plank to the extent of about thirty per cent. to about seventy per cent. The proportion of asphalt in the plank is preferably about twenty-five per cent. to about fifty-five per cent. The method and apparatus of this invention is suitable for the manufacture of the planking material disposed in the application of Harold W. Greider and Henri Marc, Serial No. 666,126, filed April 14, 1933.

The foregoing description of the composition of planking material is given merely to illustrate a type of planking material which lends itself to the practice of this invention.

In the manufacture of the plank, the first step involves the mixing of the fibre and filler material with the bituminous matrix. This may be accomplished in the mixer 10 shown in Fig. 1 of the drawings. The asphalt is usually added in a highly heated condition so that the asphalt will be fluid enough to rapidly coat the finely divided filler and fibre filler contained in the plank. Usually the asphalt is heated to a temperature of about 300° F. to about 400° F. The employment of substantially higher temperatures than those mentioned is ordinarily not desirable, as excessive fluidity of the asphalt is not favorable to the intimate commingling and blending of the solid ingredients and is likely to burn the fibre with which the hot bitumen is mixed.

The fibre material may be added to the mixer after having been moistened as by spraying with water. As soon as the hot asphalt contacts with the moisture-laden fibre, steam is produced which is driven from the mass during the mixing. About two to about five gallons of water to 100 pounds of fibre gives satisfactory results. The vaporization of the water and the driving off of the water as steam, acts to cool the hot asphalt in the mixer substantially uniformly throughout rather than at an external surface of the mixing tank. The cooling of the hot asphalt to a certain extent uniformly throughout causes the asphalt to stiffen up during the mixing and is beneficial in that the asphalt, which is first in a highly fluid condition and rapidly coats the material, by becoming stiff causes any lumps occurring in the filler material to be thoroughly broken up and disintegrated. Any lumps such as pieces of shingle scrap introduced into the mixture are thus thoroughly fiberized and broken up so that the resulting mass is made substantially homogeneous.

While it is preferable to add the water to the fibre, it is, of course, within the scope of this invention to add the water to the mineral filler that is employed or in any other manner so that the mixing of the hot bitumen with filler occurs in the presence of water. Moreover, the conception of cooling the asphalt during the mixing so as to procure a more homogeneous mixture may be carried out regardless of how the cooling effect is produced. The introduction of any substance such as benzene, naphtha or other volatile liquid into the mass which cools the asphalt substantially uniformly throughout affords improved homogenization of the mass.

In the practice of this invention, it is preferable not to incorporate all of the finely divided filler material into the mixture at the outset. It is preferable near the end of the mixing operation to add a substantial quantity of filler and then continue the mixing for only a short time. This causes the mass in the mixture to become separated into bodies or lumps which carry on the outside a quantity of filler material only partially coated with bitumen. The lumps are more or less independent of each other. In this form it has been found that the material can be readily dumped from the mixer 10 into the storage hopper 13, for example.

After a batch of material has been dumped into the storage hopper 13, the same is fed into the extrusion machine by an intermittent conveyor, the operation of which is under the control of an operator. The storage hopper and the conveyor means, either or both, are preferably heated so that the mass is subjected to heat during the storage and transferring operations and so that the plasticity of the mass will be maintained. The temperature of the mix may, however, drop so that when it is introduced into the extrusion apparatus, it will be at a temperature of about 125° F. to about 250° F. Preferably the material is passed to the extruder at a temperature of about 150° to about 200° F.

In the extruder, it is preferable in the practice of this invention to heat the material and raise the temperature of the material from about 200° F. to about 300° F. While the material is being forced to and through the extrusion die, it is subjected to homogenization wherein any uncoated filler is thoroughly coated with the bituminous matrix. In passing the material through the extrusion die, it is a feature of this invention that the material is contacted with different portions of the inner wall of the die which are maintained at different temperatures. Also in passing the material through the extrusion die, a further feature of this invention resides in compressing the material. Preferably the material in passing through the extrusion die is contacted first with a surface which is relatively cool and is favorable to forming and compacting the material by retarding the passage of the plastic material therethrough. While it is not essential to the practice of this invention, the inner confining surface of the cool zone of the extrusion die may be maintained at a temperature lower than that of the material which is brought to the inner end of the extrusion die to be forced therethrough. For example, the first portion of the extrusion die may be maintained at a temperature of about 175° F. to 250° F. After the material has been passed through the cool zone, the material is subjected to a more highly heated zone. The heated zone is preferably maintained at a temperature about 50° F. to 125° F. higher than that occurring in the cooler zone. The effect of the heated zone is to superficially soften the plastic material passing therethrough and to produce a smooth surface on the extruded material.

While this invention is preferably practiced by first contacting plastic material confined within an extrusion die, first with a relatively cool surface and then with a second surface maintained substantially at a higher temperature, it is more broadly within the scope of this invention to afford different areas of surface in the extrusion die at substantially different temperatures so that plastic material in passing therethrough is subjected on the surface thereof to substantially different temperatures. Also in this connection it is a feature of this invention to form material in an extrusion die to desired shape and immediately thereafter and as a part of the extrusion operation smooth the surface of the material.

The material emerging from the extrusion die may be further smoothed in the practice of this invention by contacting the same with appropriate surfaces, e. g., rollers. Also in the practice of this invention the extruded material may be straightened and dimensioned as by contacting the same with aligned surfaces and/or surfaces accurately positioned at desired distances and/or angles with respect to each other.

Following the dimensioning and/or smoothing and/or straightening operations to true the material, the surface of the material is preferably set in the desired condition by cooling the same. The cooling, for example, may be accomplished by application of water to the formed material to cool the same. While it is preferable to first smooth, dimension and straighten the material while the material is warm and plastic, e. g., as it emerges from the extrusion die, it is not without the scope of this invention to cool the surface of this material simultaneously with the smoothing and/or dimensioning and/or straightening operations. However, in such case greater pressure normally has to be exerted in the effecting of these operations to obtain the desired results. Also the cooling of the material can even be accomplished to a certain extent prior to the smoothing and/or dimensioning and/or straightening operations although this practice is not regarded as preferable.

After the formed material has been smoothed and partially cooled, it is cut into articles of desired length preferably prior to the completion of the cooling of the formed material. After the material has been cut into lengths, the cooling can be completed by immersing the length of the cut planking material in cold water or by other suitable means. A pulverulent material such as soapstone or mica flakes may be applied to the surfaces of the formed article so as to prevent their adhesion to one another during shipment storage.

While this invention has been described in connection with certain specified embodiments thereof, it is to be understood that this has been done for the purpose of illustration. Moreover, it is to be understood that this invention is applicable to the manufacture of other formed bituminous bodies than planks and that formed bituminous bodies of various compositions and dimensions can be made in the practice of this invention.

We claim:

1. In a method of making formed bituminous articles wherein a mixture of bituminous material and filler is forced while plastic through an extrusion die of desired cross section, the steps comprising mixing melted bituminous material with solid filler material, and causing the mixture to form into a plurality of substantially independent bodies externally carrying filler material only partially coated with the bitumen by discontinuing the mixing operation a limited time after a portion of the filler material is added to the mixture.

2. In a method of making formed bituminous articles wherein a mixture of bituminous material and filler is forced while plastic through an extrusion die of desired cross section, the steps comprising mixing with melted bituminous material fibrous filler and finely-divided filler, causing the mixture to form into a plurality of substantially independent bodies superficially carrying finely-divided filler material partially coated with the bitumen by discontinuing the mixing operation a limited time after a portion of the finely-divided filler material is added to the mixture, maintaining the material in said condition in a plasticity preserving zone, intermittently withdrawing the material from said plasticity preserving zone, homogenizing the mixture thus withdrawn and completing the coating of the finely-divided filler while maintaining the material in a plastic condition, the resulting mass being thereafter passed through the extrusion die.

3. In apparatus for making formed bituminous bodies the combination comprising horizontally extending carrying means adapted to carry an elongated body of formed bituminous material, a carriage including a surface adapted to extend across and to smooth an upper surface of a body of material on said carrying means, said carriage being borne by said body of material and mounted so as to have a substantial amount of free vertical movement relative to said carrier, and restraining means for preventing movement of said carriage so that a body of material moved longitudinally on said carrying means will be moved longitudinally relatively to said carriage.

4. In apparatus for making formed bituminous bodies the combination comprising longitudinally extending carrying means adapted to carry an elongated body of formed bituminous material, a carriage including rollers adapted to roll surfaces at an angle with respect to each other of a body of material in being moved longitudinally on said carrying means, said carriage being adapted to be borne by the elongated body carried by said carrying means, a stationary member, and restraining means between said member and said carriage for restraining the movement of said carriage in the direction of normal longitudinal movement of a body of material carried by said carrying means, said restraining means being adapted to permit a substantial amount of free lateral and vertical movement of said carriage with respect to said carrying means.

5. In apparatus for making formed bituminous bodies the combination comprising carrying means adapted to carry an elongated body of formed bituminous material, means for straightening and dimensioning the elongated body of material, said straightening and dimensioning means including a plurality of rollers arranged substantially in one plane and a plurality of rollers arranged substantially in a plane at an angle with respect to said first plane, and means for moving the elongated body longitudinally with respect to said straightening and dimensioning means and in pressure contact with said rollers.

6. In apparatus for the manufacture of formed bituminous bodies the combination comprising an extrusion die adapted to form an elongated extruded body having a rectangular cross section, means for forcing a plastic bituminous mass through said extrusion die, horizontally extending carrying means for carrying a body extruded from said extrusion die, a carriage adapted to be borne by an extruded body carried by said carrying means, horizontally and vertically extending rolling means on said carriage adapted for rolling contact with the top and sides of the body of material carried by said carrying means, means for vertically adjusting the said horizontal rolling means relative to said carriage, means for horizontally adjusting said vertical rolling means relative to said carriage, and means affording longitudinal movement of a body of material on said carrying means relative to said carriage and rolling means.

7. In apparatus for making formed bituminous bodies including an extrusion orifice and means for continuously forcing bituminous material through the extrusion orifice, the combination comprising a pair of vertically extending smoothing means spaced laterally and adapted to smooth the side surfaces of material extruded from said extrusion orifice, means for preventing movement of said smoothing means in a direction corresponding to the longitudinal movement of material extruded from said extrusion orifice, and for mounting said pair of smoothing means so as to have a substantial amount of free movement laterally, thereby enabling the smoothing means to follow any lateral movement of material being extruded from the extrusion die.

8. In apparatus for making formed bituminous bodies including an extrusion orifice and means for continuously extruding plastic bituminous material through said orifice, the combination comprising a first pair of laterally spaced vertically extending rollers adapted to roll the side surfaces of material extruded from said extrusion orifice, a second pair of laterally spaced rollers adapted to roll the side surfaces of material extruded from said extrusion orifice, said second pair of rollers being adapted to be mounted rigidly as a unit with respect to said first pair of rollers and being further removed from said orifice than said first pair of rollers, means for preventing movement of said pairs of rollers in a direction corresponding to the longitudinal movement of material extruded from said extrusion orifice, and for mounting said pairs of rollers so as to have a substantial amount of free lateral movement relative to said extrusion die, thereby enabling said pairs of rollers to follow lateral movement of material being extruded from said extrusion die.

9. In apparatus for making formed bituminous bodies including an extrusion orifice and means for continuously extruding plastic bituminous material through said orifice, the combination comprising a first pair of laterally spaced vertically extending rollers adapted to roll the side surfaces of material extruded from said extrusion orifice, a second pair of laterally spaced rollers adapted to roll the side surfaces of material extruded from said extrusion orifice, said second pair of rollers being adapted to be mounted rigidly as a unit with respect to said first pair of rollers and being further removed from said orifice than said first pair of rollers, means for preventing movement of said pairs of rollers in a direction corresponding to the longitudinal movement of material extruded from said extrusion orifice, means for mounting said pairs of rollers so as to have a substantial amount of free lateral movement relative to said extrusion die, thereby enabling said pairs of rollers to follow lateral movement of material being extruded from said extrusion die, and means for preventing the unit comprising said first pair of rollers and said second pair of rollers from twisting in a horizontal plane.

10. In a method of making a formed bituminous article wherein a mixture of bituminous material and filler while in a plastic condition is continuously brought to and forced through an extrusion die of desired cross section, the steps comprising forcing said mixture through a first portion of said extrusion die maintained substantially colder than the mixture being brought to and passed in contact therewith, and thereafter through a second portion of said die which imparts the ultimate cross-sectional dimensions to the extruded article and which is maintained at a temperature at least about 50° F. higher than said first portion, thereby, while said mixture is confined by said die, first effecting consolidation of the mixture and thereafter effecting smoothing of the surface of the mixture as it is moved through said die.

11. In a method of making a formed bituminous article wherein a mixture of bituminous material and filler while in a plastic condition is continuously brought to and forced through an extrusion die of desired cross section, the steps comprising forcing said mixture through a first portion of said extrusion die maintained approximately 50° F. to approximately 75° F. colder than the mixture being brought to and passed in contact therewith and thereafter through a second portion of said die which imparts the ultimate cross-section dimensions to the extruded article and which is maintained at a temperature approximately 50° F. to approximately 125° F. higher than said first portion and at a temperature higher than the temperature of the mixture being brought to said extrusion die, thereby, while said mixture is confined by said die, first effecting consolidation of the mixture and thereafter effecting smoothing of the surface of the mixture as it is moved through said die.

12. In a method of making a formed bituminous article wherein a mixture of bituminous material and filler in a plastic condition is continuously forced to and through an extrusion die of desired cross-section, the steps comprising forcing the mixture into a die, consolidating the material while in the die and then heating the consolidated material sufficiently to fuse the surface only thereof and expelling the material from the die.

13. In the method of claim 12, subjecting the surface of the material in the die during the surface fusing step to a temperature at least about 50° F. higher than the temperature to which the surface of the material in the die is subjected during the consolidation step.

WILLIAM BURCHENAL.
ANTHONY J. PFOHL.